Feb. 2, 1971  G. G. HULL ET AL  3,559,365

CAPPING APPARATUS AND METHOD

Filed Feb. 27, 1968  3 Sheets-Sheet 1

INVENTORS
GERRY G. HULL
EUGENE B. MORRIS, JR.
BY Newton, Hopkins,
& Ormsby
Attorneys Feb. 2, 1971  G. G. HULL ET AL  3,559,365
CAPPING APPARATUS AND METHOD
Filed Feb. 27, 1968  3 Sheets-Sheet 2

INVENTORS.
GERRY G. HULL
EUGENE B. MORRIS, JR.

BY Newton, Hopkins,
& Ormsby
Attorneys

Feb. 2, 1971  G. G. HULL ET AL  3,559,365
CAPPING APPARATUS AND METHOD
Filed Feb. 27, 1968  3 Sheets-Sheet 3
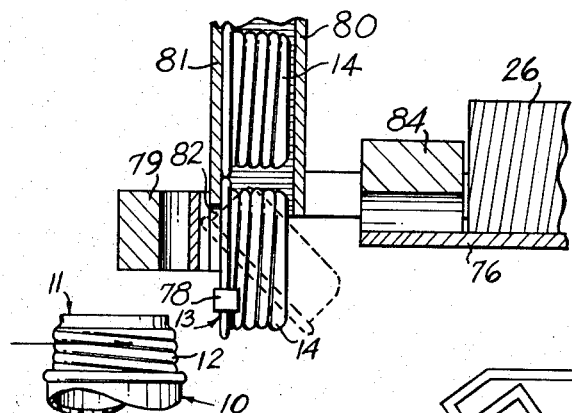
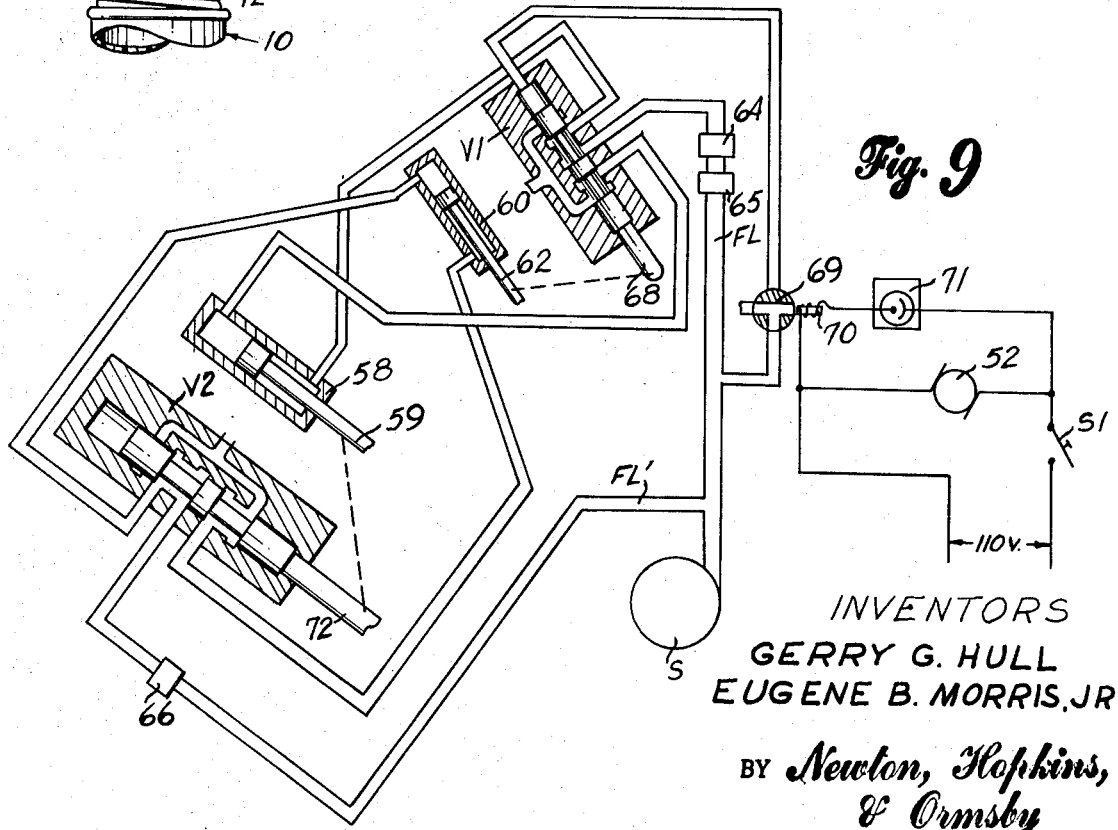
INVENTORS
GERRY G. HULL
EUGENE B. MORRIS, JR.
BY *Newton, Hopkins,*
*& Ormsby*
*Attorneys*

United States Patent Office

3,559,365
Patented Feb. 2, 1971

3,559,365
CAPPING APPARATUS AND METHOD
Gerry G. Hull and Eugene B. Morris, Jr., Atlanta, Ga., assignors to Haskon, Inc., Warsaw, Ind., a corporation of Delaware
Filed Feb. 27, 1968, Ser. No. 708,688
Int. Cl. B65b 7/28; B67b 3/20
U.S. Cl. 53—38       10 Claims

ABSTRACT OF THE DISCLOSURE

Method and apparatus for capping containers such as bottles with screw-type caps or closure members wherein the method includes the steps of moving the containers to be capped along a prescribed path at a substantially constant selected speed, positioning a screw-type cap over the mouth of the container in a position to be screwed thereon, and subsequently screwing the cap onto the container for sealing as said container is moved along said prescribed path at said substantially constant selected speed.

The apparatus is utilized in conjunction with means for moving containers to be capped along a prescribed path at a substantialy constant selected speed and includes a first means for positioning screw-type caps for closing the containers in a position whereby the upper portion of the container will engage the cap and pivot the cap over the mouth of the container as the container is moved by said conveying means, and second means for screwing the cap onto the container to seal the open mouth of said container as the container is moved by the conveying means along its prescribed path.

BACKGROUND OF THE INVENTION

(1) Field of invention

This invention relates generally to the capping of containers having open mouths and more particularly to a method and apparatus for capping bottles with a screw-type cap or closure member wherein the botles are moved at a substantially constant speed along a prescribed path while the cap is positioned on top of the bottle and subsequently screwed thereon to seal the open mouth of the bottle.

(2) Discussion of the prior art

Machines which place screw-type caps over the open mouths of containers and subsequently screw the caps thereon for sealing the containers are available in the prior art. Usually, these prior art devices require that the containers which move past the capping machine be stopped intermittently during the capping operation. When containers having a rigid wall construction, such as glass, are stopped during the capping operation, the conveying means which move the containers to and from the capping machine generally had to be stopped since continued operation of this conveying means would cause the containers to strike or bump each other which frequently resulted in breaking the walls of the containers and spilling the contents thereof. When flexible wall containers are used, such as plastic bottles, the conveying means moving the containers past the capping machine must be stopped since failure to do so will cause the containers to press against each other, thereby depressing the side walls thereof and causing the liquid to move up and through the mouth of the containers to the outside thereof.

SUMMARY OF THE INVENTION

These and other problems and disadvantages associated with prior art capping machines for sealing containers having open mouths with screw-type caps are overcome by the invention disclosed herein by providing a method and apparatus which will place a screw-type cap over the open mouth of the container and subsequently screw the cap onto the container without having to stop the movement of the container during the capping operation.

The method of the invention comprises generally the steps of moving the container to be capped along a substantially horizontal prescribed path with the open mouth thereof facing upwardly and at a substantially constant selected speed positioning a screw-type cap to be placed on the container so that the axis thereof lies parallel to the substantially horizontal prescribed conveyor path and a portion thereof is positioned for interfering contact with the upper end of the container as it is moved along the prescribed conveyor path, and from which position the cap will be pivoted onto the upper open end of the container as the container engages and moves the cap in association therewith; and subsequently screwing the cap onto the container to seal the open mouth thereof as the container and cap are moved along the prescribed path at the substantially constant selected speed.

The apparatus of the present invention includes a support means positionable adjacent a conveying means for moving the container along a prescribed path; first means for positioning a screw-type cap with respect to container on the conveying means so that the upper end thereof engages the cap and pivots the cap over the open mouth of the container as the conveying means moves the container along the prescribed path; second means for screwing the cap onto the container as it is moved by said conveying means along the prescribed path; and third means for moving the second means downwardly into engagement with the cap resting on top of the container and forwardly along the prescribed path in synchronization with the movement of the container along the prescribed path by means of the conveying means to screw the cap positioned on top of the container onto the cap seat of the open ended mouth for sealing the container.

These and other features and advantages of the invention will be more clearly understood upon consideration of the following specification and accompanying drawings wherein like characters of reference designate corresponding parts throughout and in which:

BRIEF DESCRIPTION OF THE DRAWINGS

FIG. 5 is a detailed cross-sectional view of the cap positioning means of the present invention;

FIG. 9 is a schematic diagram of a control system employed with the present invention.

These figures and the following detailed description disclose an illustrative embodiment of the present invention; however, the inventive concept is not limited thereto since it may be embodied in other forms.

DESCRIPTION OF ILLUSTRATIVE EMBODIMENTS

Figure 1:
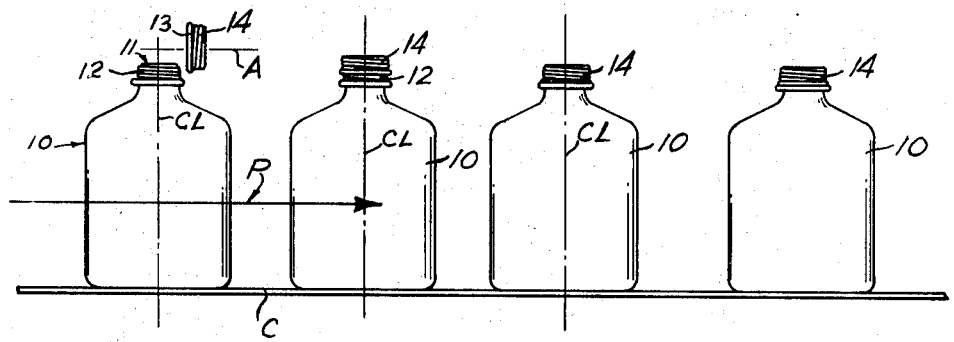
FIG. 1 is a graphic illustration of the various steps that may be utilized in the method of the present invention.
Figure 2:
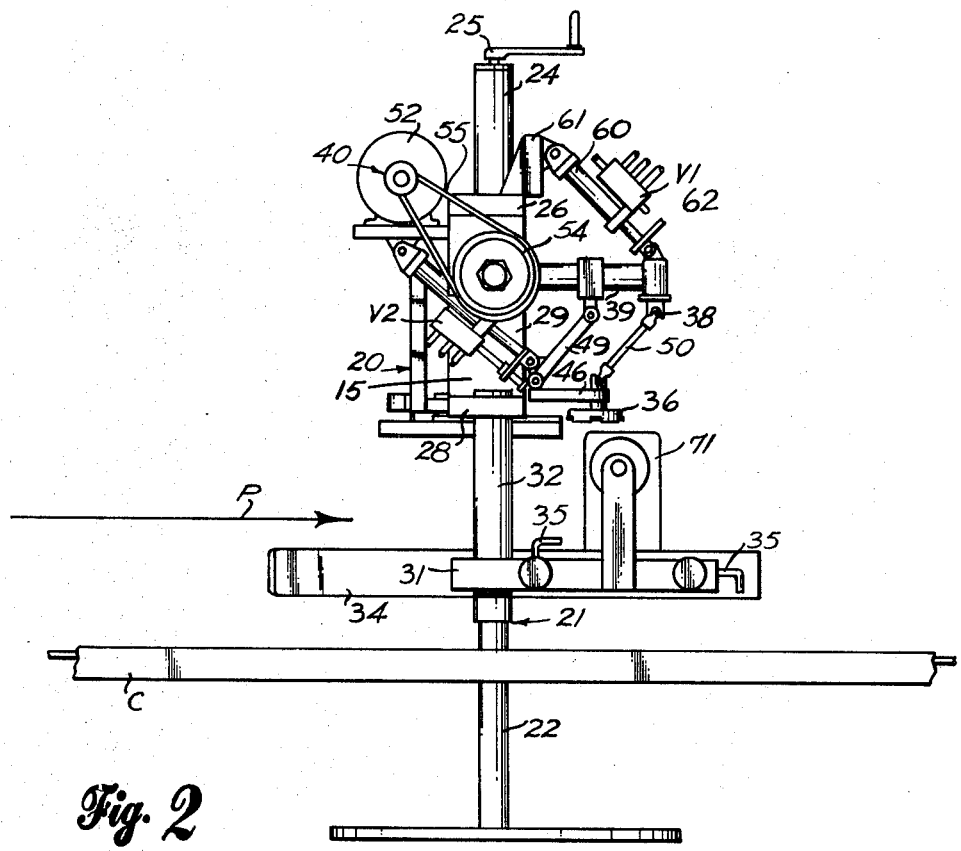
FIG. 2 is a side-elevational view of one form of illustrative embodiment of the apparatus of the present invention.
Figure 3:
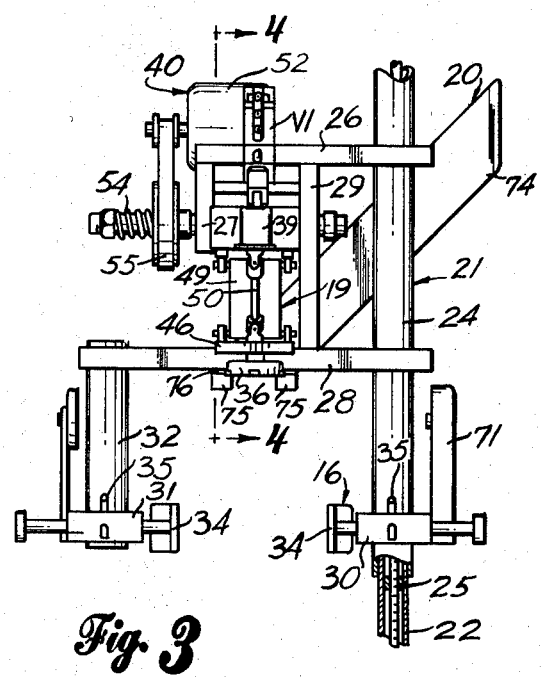
FIG. 3 is a front elevational view of the embodiment shown in FIG. 2.
Figure 6:
FIG. 6 is a schematic view of the capping head showing the path of travel thereof.

Referring to FIGS. 1 and 2, it will be seen that the apparatus of the invention is utilized in conjunction with a conventional conveying system C which moves containers 10, herein shown as bottles, along a prescribed path P at a substantially constant selected rate of speed. The container 10 defines an open mouth 11 which faces upwardly when the container 10 is placed on the conveying system C, and is provided with a screw-type cap seat 12 positioned around the open mouth 11. Screw-type caps or closure members 14 are fed in a prearranged selected arrangement from a conventional orienting or unscrambling means (not shown) and these caps 14 are applied to the cap seat 12 to seal the open mouth 11 of the container 10. The present invention is particularly adapted for utilization in applying screw-type bottle caps 14 to flexible wall containers 10 such as plastic bottles and is effective to apply the caps 14 to the cap seats 12 as the containers 10 are moved along the prescribed path P by the conveyor system C without changing the speed of the containers 10 along the prescribed path P.

The apparatus of the present invention includes generally a support frame 15, a guide assembly 16 carried by the support frame 15, a selectively extendable capping mechanism 18 pivotally mounted on the support frame 15, and a positioning means 19 for selectively extending the capping mechanism 18 and for pivoting said capping mechanism 18 with respect to the support frame 15. The support frame 15 positions the guide assembly 16 over the conveyor system C so that the containers 10 will pass therethrough and be aligned thereby. The capping mechanism 18 is positioned by the support frame 15 over the conveyor system C and in alignment over the open mouths 11 of the containers 10 as they pass through the guide assembly 16. As the conveyor system C moves the containers 10 through the guide assembly 16, a cap 14 is deposited onto the cap seat 12 and over the mouth 11 of the container 10 by a cap dispensing arrangement 20 carried by the frame 15.

As the conveyor system C continues to move the container 10 having the cap 14 resting on the cap seat 12, the positioning means 19 extends the capping mechanism 18 downwardly and forwardly into engagement with the cap 14 and the mechanism 18 screws the cap 14 down onto cap seat 12 as the container 10 is moved along the prescribed path P by the conveyor system C. When the cap 14 has been fully seated on the cap seat 12 to seal the open mouth 11, the positioning means 19 then pivots the capping mechanism 18 upwardly away from the cap 14 and retracts the capping mechanism 18 back to its original position.

The support frame 15 includes a vertical standard 21 having a lower fixed portion 22 and an upper portion 24 movably connected to the fixed portion 22 by a conventional screw-type adjusting mechanism 25. The upper portion 24 of the vertical standard 21 carries the guide assembly 16, the capping mechanism 18, the positioning means 19, and the cap dispensing arrangement 20 so that the vertical position of these components with respect to the conveyor system C can be adjusted to accommodate containers of various sizes and heights.

The support frame 15 further includes an upper support arm 26 extending horizontally outward from the upper portion 24 of the vertical standard 21 over the conveyor system C and a lower support arm 28 positioned below the upper support arm 26 parallel thereto and in vertical alignment therewith. A vertically extending support plate 29 extends between the upper support arm 26 and the lower support arm 28 adjacent the vertical standard 21 and a carriage plate 27 extends downwardly from the upper support arm 26 in a spaced parallel relationship to the support plate 29. The capping mechanism 18 is pivotally mounted between the support plate 29 and carriage plate 27 as will be explained hereinafter.

For purposes of explanation, the description is divided into the following categories: the guide assembly 16; the capping mechanism 18; the positioning means 19; and, the cap dispensing arrangement 20.

GUIDE ASSEMBLY

The guide assembly 16 includes a first horizontally extending guide support brace 30 which is carried by the lower end of the upper portion 24 of the vertical standard 21 and which extends outwardly therefrom in contilever fashion parallel to the prescribed path P along which the containers 10 pass. A second guide support brace 31 is positioned in a spaced parallel relationship to the first guide support brace 30 by a substandard 32 depending from the outer extending end of the lower support arm 28. The support braces 30 and 31 are horizontally aligned with each other and adjustably carry guides 34 thereon through an adjusting means 35 for selectively varying the position of the guides 34 with respect to each other and with respect to the prescribed path P along which the containers 10 travel. Therefore, it will be seen that as the container 10 pass along the prescribed path P on the conveying means C, the containers 10 pass between the guides 34 and are aligned for the capping operation.

CAPPING MECHANISM

The capping mechanism 18 is pivoted on the support frame 15 between carriage plate 27 and the support plate 29. The capping mechanism 18 includes a capping head 36 rotatbly carried by a parallogram linkage 38. The parallogram linkage 38 is carried by a support beam 39 which is pivotted between the carriage plate 27 and the support plate 29 to pivot about a vertical plane through which the containers 10 pass along the prescribed path P. The capping head 36 is driven by a drive unit 40 which rotates the capping head 36 continuously.

Figure 7:
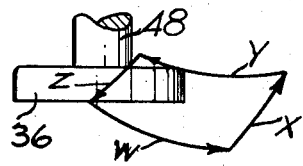
FIG. 7 is a bottom view of the capping head.
Figure 8:
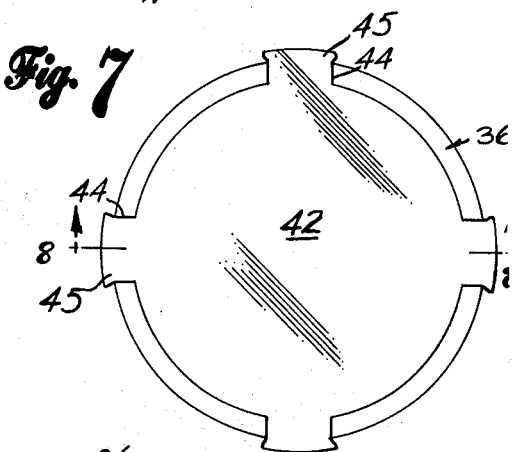
FIG. 8 is a cross-sectional view taken along the line 8—8 in FIG. 7.

The capping head 36 is a disc-shaped member having a downwardly opening recess 41 therein for receiving a driving plug 42 as shown in FIGS. 7 and 8. The peripheral edges of the capping head 36 defining the recess 41 are provided with driving notches 44 for receiving driving tabs 45 of the driving plug 42 and prevent relative movement between the capping head 36 and the driving plug 42. It will also be understood that the capping head 36 may include a plurality of downwardly opening recesses which receive a plurality of driving plugs therein to engage the caps 14 and screw the caps 14 onto the cap seats 12.

The parallellogram linkage 38 is effective to move the capping head 36 with the driving plug 42 therein along a line of motion W and down into engagement with the cap 14 resting on the container 10 as it passes along the prescribed path P while at the same time moving the head 36 forwardly parallel to the prescribed path P at the same speed that the container 10 is being moved by the conveying system C. This causes the plug 42 to screw the cap 14 onto the cap seat 12. The linkage 38 maintains the axis L of the head 36 substantially perpendicular to the path P while the head 36 moves along the line of motion W.

The linkage 38 includes a horizontally oriented bearing plate 46 which rotatably mounts an arbor 48 carrying the capping head 36. The bearing plate 46 is carried by a rear pivot link 49 pinned to that end of the bearing plate 46 opposite the arbor 48, and by a driving link 50 connected to the driving arbor 48 through a universal joint 43. The upper end of the pivot link 49 is pinned to the support beam 39 and the upper end of the driving link 50 is connected through a universal joint 47 to a drive shaft 51 rotatably extending from the extending end of the support beam 39. The pivot link 49 and the driving link 50 are so connected to the bearing plate 46 and the support beam 39 that the links 49 and 50 are maintained parallel at all times and the bearing plate 46 is maintained parallel to the center line of the support beam 39 at all times.

While the capping head 36 is actually in contact with the cap 14, the support beam 39 is maintained in a position spaced above and parallel to the prescribed path P along which the containers 10 pass so the lower surface of the plug 42 is also maintained parallel to the path P and in full contact with the cap 14. When the caps 14 are fully seated on the cap seat 12, the extending end of the support beam 39 is pivoted counterclockwise as seen in FIG. 2 to lift the bearing plate 46 and the capping head 36 upwardly from the container 10 and move the capping head 36 out of engagement with the cap 14.

The lower edges of the capping head 36 are inwardly and upwardly beveled as shown in FIG. 8. This insures that the cap 14 and container 10 will be shifted in proper position under the head 36 if there is slight misalignment of the cap 14 and container 10 with the head 36.

The drive unit 40 rotating the capping head 36 includes an electric motor 50 mounted on a motor carriage plate 53 and connected to an adjustable driving clutch 54 of conventional design through a belt drive 55. The clutch 54 is connected to the drive shaft 51 through an angle gearing arrangement (not shown) internally positioned in the support beam 39. Therefore it will be seen that as the motor 52 rotates drive shaft 51 through the driving clutch 54, the drive shaft 51 will rotate the capping head 36 through the driving link 50. By selectively varying the amount of torque that will be transmitted through the driving clutch 54 in conventional manner, the amount of torque that the driving plug 42 and the capping head 36 will exert upon the cap 14 to drive the cap 14 onto the cap seat 12 can be selectively maintained. This is effective to fully seat the cap 14 onto the cap seat 12, yet will prevent the cap 14 from striping the threads on the cap seat 12.

POSITIONING MEANS

The positioning means 19 is carried by the support frame 15 and is effective to selectively move the parallelogram linkage 38 by pivoting the links 49 and 50 forwardly away from the lower support arm 28 so that the capping head 36 is moved forwardly and downwardly simultaneously along the line of motion W to engage the cap 14 resting on the containers 10. As the capping head 36 moves along the line of motion W it has a first component of motion parallel to the prescribed path P and a second component of motion downwardly oriented.

Figure 4:
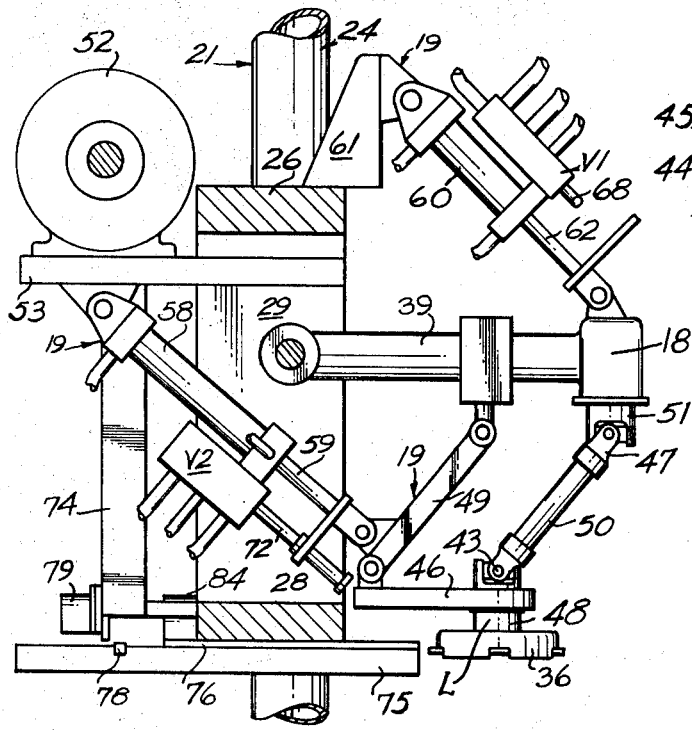
FIG. 4 is a cross-sectional view taken along the line 4—4 in FIG. 3.

When the cap 14 has been fully seated on the cap seat 12, the positioning means 19 is effective to pivot the support beam 39 counterclockwise as seen in FIG. 4 to move the forwardly extending end of the beam 39 upwardly to disengage the capping head 36 from the bottle cap 14. This moves the capping head 36 upwardly along the line of motion X.

The positioning means 19 then pivots the links 49 and 50 back toward the lower support arm 28 along a line of motion Y. After this movement is completed, the support beam 39 is pivoted clockwise as seen in FIG. 4 to return the capping head 36 to its initial position along the line of motion Z for repeating the capping operation.

The positioning means 19 comprises a first fluid cylinder 58 pinned to the underside of the motor carriage plate 53 and having its piston rod 59 pinned at the extending end of the pivot link 49. It will thus be seen that extension of the piston rod 59 will cause the parallelogram linkage 38 to move the capping head 36 forwardly and downwardly from the lower support arm 28 along the line of motion W and that retraction of the piston rod 59 will move the capping head 36 upwardly and toward the lower support arm 28. As the capping head 36 is moved along the line of motion W, the cap 14 is screwed onto the cap seat 12.

The positioning means 19 also includes a second fluid cylinder 60 pinned to an extension 61 carried by the upper support arm 26 and its piston rod 62 is pinned to the forwardly extending end of the support beam 39. Retraction of the piston rod 62 will raise the forwardly extending end of the support beam 39 and extension of piston rod 62 will lower the forwardly extending end of the support beam 39.

The first fluid cylinder 58 is selectively connected to a conventional pressurized fluid source S through a fluid line FL, a first fluid valve V1, a pressure regulator 64, and a flow control valve 65. The fluid cylinder 58 is activated by the fluid valve V1, as the container 10 moves into position with the cap 14 associated thereon to be capped. This causes the piston rod 59 to be extended to lower the capping head 36 down over the cap 14 along the line of motion W and screw the cap 14 into place on the cap seat 12. The flow control valve 65 is regulated to synchronize the rate of extension of the piston rod 59 with the rate of movement of the container 10 along the prescribed path P by the conveyor system C. This insures that the speed of the container along the prescribed path P is not changed as a result of the capping operation. The pressure regulator 64 is utilized to regulate the pressure to the fluid cylinder 58 in conventional manner to prevent damage to the cap 14 or the container 10 during the capping operation. A fluid pressure of approximately 80 p.s.i. has been found to be satisfactory.

The second fluid cylinder 60 is connected to the pressurized fluid source S through a fluid line FL', a second fluid valve V2, and a pressure regulator 66 similar in construction to the pressure regulator 64. The second fluid valve V2 is effective to normally maintain the piston rod 62 in an extended position. The valve V2 is activated when the piston rod 59 is fully extended and the cap 14 screwed onto the container 14 and is effective to retract the piston rod 62 and lift the capping head 36 out of engagement with the cap 14 along the line of motion X. The pressure regulator 66 is adjusted to a pressure range which insures driving contact between the driving plug 42 and the capping head 36 while limiting the pressure exerted on the cap 14 by the plug 42 so that the bottle cap 14 and the container 10 will not be damaged during the capping operation. A fluid pressure of approximately 40 p.s.i. has been found to be satisfactory for this result.

The first fluid valve V1 is a conventional four-way spool type fluid valve located adjacent the second fluid cylinder V2 and mechanically transferred to a first position by a plunger 68 connected to the piston rod 62. When piston rod 62 is retracted, the plunger 68 transfers the valve V1 to the first position and the piston rod 59 will be retracted. The valve V1 is transferred to a second position by a fluid pilot. When the valve V1 is in the second position, the piston rod 59 is moved to an extended position thereby moving the capping head 36 along the line of motion W.

The fluid pilot for valve V1 is operated by a solenoid operated three-way, spool type valve 69 having the solenoid 70 thereof activated by a conventional photo electric switch 71 directing a light beam B across the prescribed path P. When the light beam B across the prescribed path P is broken by the passage of a container 10 along the path P, the solenoid 70 is activated to move the solenoid valve 69 to a first position wherein fluid pressure is applied to the first fluid valve V1 and transfer the valve V1 to the second position. This causes the fluid cylinder 58 to extend the piston rod 59 thereof and move the rotating capping head 36 forwardly and downwardly along the line of motion W. As soon as the light beam B is re-established the solenoid 70 moves the solenoid valve to a second position and releases the pressure on the fluid pilot.

The second fluid valve V2 is a conventional four-way spool valve located adjacent the first fluid cylinder V1 and is mechanically activated through a plunger 72 connected to the piston rod 59. When the piston rod 59 is fully retracted, the plunger 72 transfers the valve V2 to a first position which causes the piston rod 62 to be extended and lower the forwardly extending end of the beam 39. When the piston rod 59 is fully extended, the plunger 72 transfers the valve V2 to a second position which causes the piston rod 62 to be retracted and raise the forwardly extending end of the beam 39.

CAP DISPENSING ARRANGEMENT

The cap dispensing arrangement 20 is mounted on the lower support arm 28 opposite the capping head 36 and is effective to receive the caps 14 from a conventional orienting or unscrambling device (not shown) and dispose the caps 14 so that the open end 13 thereof faces the containers 10 as they move along the prescribed path P by the conveyor system C. This maintains the axis of the cap 14 substantially parallel to the prescribed path P and positions the lowermost portion of the cap 14 for interferring contact with the upper end or cap seat 12 of the container 10 as it is moved along the prescribed path P.

The cap dispensing arrangement 20 includes a cap chute 74 which receives the cap 14 from the orienting or unscrambling device and moves the cap 14 downwardly under the force of gravity while maintaining the axis A of the cap 14 substantially horizontal. The cap chute 74 is arranged to discharge the caps 14 between a pair of cap guides 75 carried by the underside of the support arm 28. The cap guides are arranged in a spaced parallel relationship with each other and are maintained parallel to and spaced above the prescribed path P. The cap guides 75 are spaced just sufficiently far enough apart for the caps 14, when engaged by the containers 10, to slidably pass therebetween. The cap guides 75 are mounted to the underside of the lower support arm 28 by a generally horizontally disposed guide plate 76.

A pair of stops 78 are carried on the upper portion of the cap guide 75 and serve to engage the outer periphery of the cap 14 as the cap moves along the cap chute 74 to prevent inadvertent discharge of the cap 14 from the cap chute 74. A retarding magnet 79 is positioned on the rearmost side of the cap chute 74 adjacent the stops 78 and serves to maintain the axis A of the cap 14 horizontally positioned while preventing inadvertent discharge of the cap 14 from the cap dispensing arrangement 20.

The forward most wall 80 of the cap chute 74 terminates just below the uppermost portion of the cap 14 when the periphery thereof engages the stops 78 while the rearmost wall 81 of the cap chute 74 extends down further than the forwardmost wall 80 to terminate just above the stops 78. A slot 82 is defined through the rearmost wall 80 adjacent the magnet 79 and extends from the lowermost end of the wall 81 upwardly to just below the uppermost portion of the cap 14 when the cap 14 rests on the stops 78. When the uppermost portion of the container 10 including the cap seat 12 engages the lowermost portion of the cap 14 extending below the stops 78 and moves the lowermost portion of the cap 14 forwardly in the machine and out of engagement with the stops 78, the bottle cap 14 will be displaced downwardly and the uppermost portion of the bottle cap 14 drops through the slot 82 and makes a sufficient magnetic connection with the magnet 79 which insures that the bottle cap 14 will be tipped rearwardly onto the cap seat 12 of the container 10 and pivots the cap 14 down to rest on the cap seat 12 just below the guide plate 76 and between the cap guides 75.

An alignment magnet 84 is positioned above the guide plate 76 at the point where the cap 14 has been deposited on top of the cap seat 12 of the container 10 and is free of the magnet 79. This lifts the cap 14 slightly upwardly from the cap seat 12 without disengaging it from the upper end of the container 10 to align the axis A of the cap 14 with the vertical centerline CL of the container 10. Since this operation does not raise the cap 14 out of engagement with the upper end of the container 10, the container 10 continues to move the cap 14 between the cap guides 75 and under the guide plate 76 as the conveyor system C moves the container 10 along the prescribed path P. The container 10 then moves the cap 14 out of the magnetic field of the alignment magnet 84, from under the guide plate 76, and from between the cap guides 75 to a position under the capping head 36 wherein the photoelectric switch 71 is activated to complete the capping operation.

OPERATION

The capping apparatus is first positioned adjacent the conveyor system C so that the guide assembly 16 overlies the prescribed path P along which the containers 10 will pass. The adjusting mechanism 25 is manipulated to adjust the height of the capping apparatus for capping the particular size containers 10 being run. The adjusting means 35 is manipulated to space the container guides 34 about the prescribed path P for properly aligning the containers 10 under the cap dispensing arrangement 20 and the capping mechanism 19.

The conveyor system C is then operated in a conventional manner. Caps 14 are supplied to the cap dispensing arrangement 20 in conventional manner from the orienting or unscrambling device, and the drive unit 40 is activated to rotate the capping head 36 clockwise as shown in FIG. 7 by closing power switch S1 shown in FIG. 9. This also activates the control circuit associated with the photoelectric switch 71. Fluid under pressure is supplied to valves V1 and V2 from the pressure source S in a conventional manner.

As the caps 14 are received in the cap chute 74, they are already oriented so that the open end 13 thereof faces the oncoming containers 10 being moved on the conveyor system C. The caps 14 drop downwardly along the chute 74 under the forces of gravity until this movement is checked by the stops 78 engaging the periphery of the lowermost cap 14. The lowermost cap 14 is maintained in a position so that the axis A of the cap 14 is substantially horizontal and parallel to the prescribed path P by the magnet 79. The stop 78 positions the lowermost portion of the cap 14 for interfering contact with the upper portion of the container 10 as it passes along the path P.

The forwardmost container 10 on the conveyor system C is moved along the path P and the upper end thereof engages the lowermost portion of the cap 14 retained by the stops 78 and displaces the periphery of the cap 14 therefrom. This allows the cap 14 to drop downwardly slightly whereupon the magnetic field from the magnet 79 causes the upermost portion of the cap 14 to move rearwardly through the slot 82 and into close proximity with the forward face of the magnet 79. As the container 10 continues to move the lowermost portion of the cap 14 forwardly, the uppermost portion thereof slides down the slot 82 and is finally deposited on top of the cap seat 12 and over the open mouth 11.

As the container 10 continues to move the cap 14 forwardly along the path P, the cap 14 is moved into the magnetic field of the alignment magnet 84. This lifts the cap 14 from the cap seat 12 up against the bottom of the guide plate 76 but not out of engagement with the upper end of the container 10. The cap 14 is now properly aligned over the cap seat 12; and, as the container 10 continues to move the cap 14, the cap is displaced from the magnetic field of the magnet 84 and drops back on top of the cap seat 12 in proper alignment therewith to be screwed in place thereon.

The container 10 continues to move along the path P with the cap 14 on top of the cap seat 12. When the container 10 moves the cap 14 into vertical alignment with the capping head 36, the light beam B of the photoelectric switch 71 is broken to transfer valve V1 to the second position. This causes the piston rod 59 to extend thereby pivoting the linkage 38 and causing the rotating capping head 36 to be moved along the line of motion W.

Since the forward component of motion of the capping head 36 is equal to the rate of movement of the container 10 and cap 14 along the path P, the head 36 remains in alignment with the cap 14 and container 10. The downward component of motion of the capping head 36 moves the driving plug 42 into engagement with the upper surface of the cap 14. The rotating driving head 36 rotates the cap 14 to screw it onto the cap seat 12. When the cap 14 is fully seated by a predetermined amount of torque, the clutch 54 allows the head 36 to stop rotating to prevent the stripping of the threads of the cap seat 12.

When the piston rod 59 has fully extended the plunger 72 is manipulated to transfer the valve V2 to its second position. This causes the piston rod 62 to retract and pivot the suport beam 39 counterclockwise and quickly lift the driving plug 42 from engagement with the cap 14 along the line of motion X. The container 10 having the cap 14 fully seated thereon continues along the path P without any variance in the rate of speed thereof.

The plunger 68 is manipulated when the piston rod 62 is fully retracted to transfer valve V1 to its first position. This causes piston rod 59 to retract and move the capping head 36 along the line of motion Y.

When the piston rod 59 is fully retracted, the plunger 72 is manipulated to transfer valve V2 to its second position. This causes the piston rod 62 to be extended and lower the capping head 36 to its initial position along the line of motion Z. The operation is then repeated on another container 10.

While specific embodiments of the invention have been set forth hereinabove, it is understood that modifications, substitutions, and variations may be made in the described embodiments without departing from the scope of the invention as set forth in the appended claims.

We claim:

1. The method of capping containers with screw-type caps which comprises moving said containers along a predetermined straight line path at a uniform rate; depositing a cap on each container; moving a rotating capping head from a position above the top of a container having a cap thereon, simultaneously downwardly and forwardly along the path at the same speed as the container until the head is brought into rotating engagement with the cap and moving the head horizontally along the path in engagement with the cap until the cap has been rotated to the desired position on the contanier; raising the head out of engagement with the cap while simultaneously moving the head forwardly; moving the head rearwardly and upwardly, and then, while moving the head rearwardly, lowering it to its original position, all the said movements of the container and capping head taking place along the said straight line path.

2. Apparatus for capping containers with screw-type caps comprising means for moving said containers along a prescribed path at a substantially constant speed; means for depositing a cap on each container; a fixed support positioned adjacent the prescribed path; a capping mechanism mounted on the support and including a capping head spaced above and aligned with the said path; means for rotating the capping head; and, means for moving the capping head first forwardly along the path at the same speed at which the containers are traveling and simultaneously downwardly into engagement with the cap on a container along and parallel with the path in continued and rotating engagement with the cap, second upwardly and forwardly to disengage the head from the cap, third rearwardly and upwardly, and fourth rearwardly and downwardly to the starting position; the means for depositing the caps on the containers including a cap dispensing means located adjacent the prescribed path and comprising a stop means adapted to check the downward movement of a cap in a position in which its lower edge will be engaged by a container moving along the path, and a magnet adjacent the stop means for holding the cap in proper position to be engaged by an advancing container.

3. Apparatus for capping containers with screw-type caps comprising means for moving said containers along a prescribed path at a substantially constant speed; means for depositing a cap on each container; a fixed support positioned adjacent the prescribed path; a capping mechanism mounted on the support and including a capping head spaced above and aligned with the said path; means for rotating the capping head; and, means for moving the capping head first forwardly along the path at the same speed at which the containers are traveling and simultaneously downward into engagement with the cap on a container along and parallel with the path in continued and rotating engagement with the cap, second upwardly and forwardly to disengage the head from the cap, third rearwardly and upwardly, and fourth rearwardly and downwardly to the starting position; the means for moving the capping head into and out of cap-engaging position including a parallelogram linkage.

4. Apparatus as in claim 3 also including a fluid cylinder, a piston mounted in the cylinder and having a piston rod connected to one of the linkages, and means to supply fluid to the cylinder.

5. Apparatus as in claim 3 also including two fluid cylinders each having a piston and piston rod, each rod being secured to a linkage of the parallelogram adjacent one corner thereof, the said corners being diagonally opposite, and means for supplying fluid to the cylinders.

6. Apparatus as in claim 5 also including valve mechanism for controlling the supply of fluid to the cylinders, a photo-electric cell so positioned as to be responsive to the arrival of a container at a point immediately below the capping head, and means controlled by the said cell for initiating the downward and forward movement of the capping head.

7. Apparatus for capping containers with screw-type caps comprising means for moving said containers along a prescribed path at a substantially constant speed; means for depositing a cap on each container; a fixed support positioned adjacent the prescribed path; a capping mechanism mounted on the support including a capping head spaced above and aligned with the said path; means for rotating the capping head; and, means for moving the capping head first forwardly along the path at the same speed at which the containers are traveling and simultaneously downwardly into engagement with the cap on a container along and parallel with the path in continued and rotating engagement with the cap, second upwardly and forwardly to disengage the head from the cap, third rearwardly and upwardly, and fourth rearwardly and downwardly to the starting position; and, means responsive to the arrival of a container at a predetermined position for initiating the forward and downward movement of the capping head.

8. Apparatus as in claim 7 wherein the last mentioned means includes a photo-electric cell.

9. Apparatus for capping containers with screw-type caps comprising means for advancing containers along a fixed paths, means for depositing caps on the containers including a dispensing means mounted adjacent the path and comprising guide members arrayed to feed the cap singly vertically downward, stop means for arresting the movement of a cap at a position in which its lower portion only will be engaged by the top of an advancing container, and a magnet located adjacent the stops and so positioned that it will hold a cap resting on the stops in vertical position but will gradually release the cap as its lower edge is drawn forward by the container.

10. Apparatus as in claim 9 in combination with a second fixed magnet spaced above the path and beyond the point at which caps are applied to the containers, the spacing being such that the magnet will lift the caps only slightly from the containers, with the lower portions of the caps still being engaged and drawn along the path by the containers, thus insuring proper positioning of the caps, and a capping head located adjacent the path beyond the second magnet for rotating the caps to final position on the containers.

References Cited

UNITED STATES PATENTS

| | | | |
|---|---|---|---|
| 1,598,392 | 8/1926 | Risser | 53—331.5 |
| 1,835,335 | 12/1931 | Risser | 53—317 |
| 2,440,030 | 4/1948 | Thomas | 53—314 |
| 2,732,991 | 1/1956 | De Bastos et al. | 53—314 |
| 2,836,947 | 6/1958 | Day et al. | 53—314 |
| 3,460,312 | 8/1969 | Stover | 53—315X |

THERON E. CONDON, Primary Examiner

R. L. SPRUILL, Assistant Examiner

U.S. Cl. X.R.

53—76, 315, 317, 331.5